Patented May 1, 1951

2,550,939

UNITED STATES PATENT OFFICE 2,550,939

RECOVERY OF ACTINOMYCES GRISEUS ELABORATION PRODUCTS

Edwin M. Richardson and Gordon A. Grant, Montreal, Quebec, Canada, assignors, by mesne assignments, to Ayerst, McKenna & Harrison Limited, New York, N. Y., a corporation of New York No Drawing. Application October 9, 1945, Serial No. 621,388

19 Claims. (Cl. 260—210)

This invention relates to antibiotic substances and more particularly to those resulting from the growth of the fungus *Actinomyces griseus*.

Waksman and his associates (A. Schatz, E. Bugie and S. A. Waksman, Proc. Soc. Exp. Biol. and Med. 55.66, 1944) described the culture of this fungus to produce liquids containing antibiotic substances.

It is an object of the present invention to provide improved methods for the recovery, from such liquids and others containing them, of an antibiotic substance or substances resulting from the growth of *Actinomyces griseus* and to provide new products having antibiotic activity.

According to one of our preferred methods, a broth resulting from the growth of *Actinomyces griseus* on a conventional culture medium, as for instance Waksman's, is treated with an adsorbent, for example charcoal, the adsorbent with an eluting agent, desirably an acid-alcohol mixture, the active eluate resulting neutralized, forming a precipitate containing antibiotic activity. The filtrate is concentrated, say by distillation at low temperature in vacuo, and the concentrate acted on to remove, preferably by precipitation with acetone, a second fraction containing the antibiotic substances. The resulting precipitates are then further purified, for instance, by treatment with phosphotungstic or flavianic acid or by chromatographic adsorption.

As an adsorbent, we prefer to employ charcoal, by choice "Norite A." We have, however, found also that a cation exchange material, for instance "Amberlite IR-100" resin is effective as an adsorbent.

For the elution, from charcoal, we prefer to employ acid-alcohol mixtures, for instance, onetenth normal acid in methanol. Aqueous acid solutions are also effective. As the acid constituent, inorganic acids, particularly hydrochloric and sulphuric are effective. The acid may be removed from the eluate by neutralization to pH from about 3 to about 7.5, preferably about 6 with an alkali, preferably, sodium hydroxide in methanol, and subsequent removal of the insoluble salts. Alternatively, neutralization can be effected by treatment with an anion exchange material, as for instance, "Amberlite IR-4" resin. Where sulphuric acid is used in the eluting agent, and an anion exchange resin for the subsequent removal of the acid, it has been found that, at a pH from about 2 to about 6, preferably from about 2.5 to about 3.5, an insoluble precipitate is formed, which contains a considerable portion of the antibiotic activity in a purified state. The precipitate can be removed by filtration to yield a purified preparation of the antibiotic substances. This sulphate precipitate, we have discovered, can be converted to the hydrochloride by treatment with an anion exchange material, for instance, "Amberlite IR-4" resin, containing hydrochloric acid, without appreciable loss of potency.

It is thus seen that, if sodium hydroxide in methanol is used to neutralize the sulphuric acid eluate, under our preferred conditions, the precipitate of sodium sulphate contains most of the potency. If the same solution is used to neutralize the hydrochloric acid eluate, under our preferred conditions, the potency does not come down with the sodium chloride precipitate, but the major portion remains in the supernatant. Neutralization can also be effected by treating the sulphuric acid eluate with an aqueous solution of barium hydroxide, in which case, most of the antibiotic potency remains in the solution, the insoluble barium sulphate being removed.

Where a cation exchange material is used as the adsorbent, the eluting agent is generally of the same nature as for charcoal, but stronger. For instance, we prefer to employ acid solutions having a strength from 1 to 3 normal. We have also found hydrochloric acid to be preferable to sulphuric acid, where a cation exchange material is the adsorbent.

For the acetone precipitation step referred to above, we have found fractional precipitation with acetone effective. According to this procedure, the concentrate is first treated with increasing amounts of acetone effective to remove insoluble impurities and is then treated with excess acetone to form a precipitate containing the antibiotic substance. Alternatively, we have used immediate precipitation with excess acetone to obtain the total potency as a crude precipitate in a less purified state. Ether may also be used, as suggested by Waksman, but we much prefer acetone, since we have found that this liquid is effective for the present purposes, particularly because of its miscibility with aqueous alcohol solutions. The acetone precipitate can be redissolved and adsorbed on a cation exchange material, or fractionally precipitated with acetone.

In an alternative procedure, the concentrate is treated with an acid effective to precipitate the antibiotic material as an acid salt, for instance, phosphotungstic or flavianic acid. The precipitate can be decomposed with a stronger acid, as for instance, dilute hydrochloric acid, and the latter acid finally removed, for instance, by extracting the phosphotungstic acid with an organic solvent mixture immiscible in water, as for instance, an amyl alcohol-ether mixture, and then neutralizing the aqueous solution with an anion exchange material, for example "Amberlite IR-4" resin thus removing excess acid. The product resulting is freeze-vacuum dried to recover the antibiotic activity as a powder. By this procedure useful derivatives can be prepared, namely, the flavianate or the phosphotungstate, as the case may be, of the antibiotic substances. This type of precipitation and subsequent treatment can also be employed at other stages of our procedure, for instance, to treat a solution of the acetone precipitate referred to above, or to treat the precipitate which separates out from the sulphuric acid eluate on neutralization.

We have also used a cation exchange material at intermediate stages of the recovery, for instance, to adsorb the potency of the neutralized eluate, and to adsorb, from a solution containing it, the potency of the precipitate resulting from acetone or ether precipitation. When the eluate is treated, it is preferably first diluted with water, then passed through a column containing the cation exchange material. The potency is adsorbed on the latter and is eluted by using a hydrochloric acid solution, preferably a weak solution, for instance 1 to 3 normal, desirably after passing water through the column. The resulting solution is then neutralized and freeze-vacuum dried to a powder containing antibiotic activity.

Where selective chromatographic adsorption is employed to purify the antibiotic substances, for instance, those contained in a precipitate of the nature of that described in Example 3, the procedure is as follows. The precipitate is dissolved in an anhydrous organic solvent, by choice methanol. The potency from that solution is then adsorbed on a column of acid-washed alumina. The column is developed by using aqueous solutions of the same or another organic solvent of decreasing strengths. For instance, successive elutions are effected with eluants which contain predominantly organic solvent, for example from about 90% to about 70%, then elutions are effected in which the organic solvent and water are present in approximately equal volumes, or with the solvent slightly predominating, for instance, between about 50% and about 60%, then, elutions are effected in which the eluant contains predominantly water, for instance, from about 50% down to about 10% solvent. The eluates are collected separately. It is found that most of the antibiotic activity is recovered in substantially purified form, from those eluates in which the water and organic solvent are present in substantially equal volumes or in which the organic solvent is in slight predominance. Cruder material containing antibiotic activity is recovered from the other eluates.

The products resulting from the various procedures described above may be concentrated to dryness, for instance, by freeze-vacuum drying. Such dried products are powders which are water-soluble, practically insoluble in most organic solvents, with the exception of methanol, and have antibiotic activity.

Some of the steps described above are believed to be novel in themselves, others in combination, as defined in the accompanying claims.

As will be realized by those skilled in the art, the recovery of the antibiotic activity, especially in good yield is unexpected with the particular means employed. Likewise, certain of the products resulting from the application of these steps and combinations thereof are believed to be novel.

EXAMPLES

To illustrate the invention in more detail, several examples will be given of specific embodiments. These data are intended in an illustrative and not in a restrictive sense.

*Example 1*

The starting material was a broth resulting from filtering through cheesecloth an 11 days' surface culture of *Actinomyces griseus* on a culture medium consisting of

| | Per Cent |
|---|---|
| Glucose | 1 |
| Beef extract ("Difco") | .5 |
| "Difco" peptone | .5 |
| Sodium chloride | .5 |
| Water | 97.5 |

To 100 parts of this broth was added 1 part of "Norite A" activated carbon, with thorough stirring for about ¾ hr. The "Norite A" was then filtered off through a Buechner funnel having a "Celite" pad and the active fraction eluted by treating with ⅕ of the volume of the original broth of $\frac{1}{10}$ normal hydrochloric acid and methanol solution. This elution was repeated using about $\frac{1}{15}$ of the volume of the original broth of the eluting agent.

The eluate resulting was neutralized with "Amberlite IR-4" anion exchange resin to a pH of about 6 by continuous stirring of the resin mixture. The neutralized eluate, after removal of the resin, was concentrated to about 100th of its volume by distillation in vacuo keeping the temperature below about 30° C. The concentrated eluate was then precipitated with about 10 volumes of acetone.

Several lots of the product resulting from the above procedure were assayed and found to have antibiotic activity ranging from about 40 to about 100 units per mg. The unit used is that described by Waksman and the cup plate method was employed using *B. subtilis* and *E. coli*.

The yield of original potency isolated by this procedure was from about 50% to about 90%.

*Example 2*

An eluate was obtained as in Example 1. Instead of "Amberlite IR-4" resin for the neutralization there was employed sodium hydroxide, and the solution neutralized to a pH of about 6. In this case, a precipitate of sodium chloride resulted and this was filtered off before concentration. During the concentration, which was carried to about 100th of the original volume, other inactive precipitates were obtained and filtered off before the final acetone precipitation. Otherwise, the procedure was that of Example 1.

The yield of original antibiotic potency isolated in the final fraction was from about 50% to about 100%, having an activity of about 30 to about 60 units per mg.

*Example 3*

7.7 litres of neutralized eluate having a pH of about 5.7, prepared as in Example 2, from about 33 litres of harvested broth (containing 2.6 million units of antibiotic activity) after the separation of 56.5 grams of insoluble precipitate, containing salts and other impurities, was concentrated down to 100 cc., removing precipitate containing undesirable impurities which formed during the concentration (84 gms.).

To the 100 cc. concentrate was added about 50 cc. of acetone, and the resulting precipitate, 29.3 grams containing further impurities, but very little antibiotic activity, was filtered off and then about 600 cc. of acetone added to the filtrate, which resulted in the formation of an active precipitate (37.8 gms.).

This precipitate was assayed and found to contain about 1.9 million units of antibiotic activity. The assay was performed as in Example 1 and the precipitate had an activity of 40 units per mg.

Example 4

The procedure of Example 1 was followed with the exception that, after the neutralizing of the eluate, the latter was treated with an excess of "Amberlite IR-100" cation exchange resin thereby removing the potency from the solution. The resin containing the potency was eluted with 2 normal aqueous hydrochloric acid and a portion of the acid solution thus obtained neutralized with sodium hydroxide to pH 6.5 and the remainder with "Amberlite IR-4" resin to pH 6.5. The neutralized solutions were then concentrated to dryness by freeze-vacuum drying.

The antibiotic activity of the resulting solids was approximately 80% that of the untreated eluate.

Example 5

16 litres of culture broth obtained as in Ex. 1 and containing 2.3 million units of antibiotic activity were treated with 160 grams of "Norite A" and stirred for about one hour. The "Norite A" was then filtered and the antibiotic activity eluted from this adsorbate with 1.5 litres of .5 normal sulphuric acid in methanol. The eluate was assayed and found to contain 1.3 million units of antibiotic substances. An aliquot, 250 cc. of this eluate (representing 200,000 units of activity) was treated with 125 grams of "Amberlite IR-4" resin and stirred until the pH had reached about 3.0. The resin was separated from the turbid supernatant and the precipitate in the supernatant removed by filtration. The precipitate when dried constituted 449 mg. of a buff coloured powder, which was found to contain 74,500 units of antibiotic potency or an activity of 165 units per mg. The remainder of the potency was recovered from the supernatant by concentration and precipitation with excess ether, yielding 918 mg. of precipitate, having an activity of about 75 units per mg. Further antibiotic activity was obtained from the resin by washing with water and subsequent concentration of the aqueous solution to dryness by freeze-vacuum drying.

Example 6

400 cc. of broth, resulting from growth of *Actinomyces griseus* according to Waksman's method, containing about 19,000 units of antibiotic activity was passed slowly once through a column about 1" in diameter and about 8" high containing about 100 gms. of "Amberlite IR-100" resin. It was found that the antibiotic activity was substantially completely adsorbed on the resin. The column was then treated with an aqueous 2 normal hydrochloric acid solution and this acid solution then neutralized with "Amberlite IR-4" resin, to a pH of about 7. The treatment with the "Amberlite IR-4" was also carried out in a column. The final solution contained about 14,000 units of antibiotic activity. The antibiotic substance was obtained as a powder by concentration to dryness through freeze-vacuum drying.

Example 7

One hundred mg. (10,000 units) of a sample of the sulfate of the antibiotic material as obtained in Example 5 assaying 100 units/mg. were dissolved in 3 cc. distilled water and a solution of 100 mg. flavianic acid in 1 cc. water added. The culture medium used was made up as follows: glucose 1%, beef extract ("Difco") .5%, peptone "Difco" .5%, sodium chloride .5%, water 97.5%. Incubation was carried out, according to conventional surface culture methods for several days, resulting in the formation of a broth containing antibiotic activity. The precipitate, 56 mg., assayed 115 units/mg. or 6,450 units total of antibiotic activity.

Example 8

Five hundred mg. (25,000 units) of the antibiotic material obtained as in Example 2 assaying 50 units/mg., were dissolved in 20 cc. of 7% hydrochloric acid. Phosphotungstic acid, 9 cc. of a 15% solution was added, the precipitate filtered and washed with 1 cc. of 2.5% of phosphotungstic acid in 1N hydrochloric acid. The precipitate was suspended in 10 cc. water containing .65 cc. concentrated hydrochloric acid, and the mixture extracted with three 1 cc. portions of a mixture containing 25 pts. ether, 20 pts. amyl alcohol, and 1 pt. ethyl alcohol. The aqueous solution, after neutralization with "Amberlite IR-4" assayed 10,500 units. This solution on freeze-vacuum drying gave 11 mg. of material having an antibiotic activity of 89 units/mg., a total of 9,900 units.

Example 9

A column of acid-washed Brockmann's alumina was prepared as follows:

The alumina was treated with 10% hydrochloric acid, filtered, and washed with water until a pH of 5.28 was obtained in the eluate. The column was then treated with anhydrous methanol until all the water had been removed.

A solution of the precipitate obtained in Example 3 (500 mg. in 12.5 ml. anhydrous methanol) was then adsorbed on the column and developed with successive 10 ml. portions of (90, 90, 80, 70, 60, 50, 40, 40, 30, 20, 10 per cent by volume) of aqueous methanol. The eluates were collected separately and it was found that most of the potency (76%) was recovered in the 60% and 50% eluates. Upon concentration to dryness, antibiotic substances were obtained which were found, on assay, to have an activity of 83 units per mg. for the 60% eluate and 139 units/mg. for the 50% eluate. A more impure material was recovered from the remaining eluates.

The starting material from which the antibiotic substances are recovered, according to the invention, is generally a broth resulting from the growth of *Actinomyces griseus* on a conventional culture medium as for instance that described by Waksman and his associates in the reference mentioned above. This broth, may of course, be partially purified or otherwise treated before the present invention is applied thereto, and, as indicated herein, certain steps may be applied at intermediate stages in the recovery.

As adsorbent materials we have mentioned "Norite A" which is a charcoal or activated carbon available commercially. It will be understood that, other materials preferably activated carbons, may be used in place of this particular material. We have also mentioned "Amberlite IR-100" and "Amberlite IR-4" ion exchange resins sold by Resinous Products Company. It will, of course, be understood that other ion exchange materials which are equivalent for the purposes of the present invention can be substituted for the "Amberlites."

In order to describe more specifically what we mean by ion exchange materials and more particularly by "Amberlite" resins we furnish the following explanation. For instance, a class of cation exchange resins, we prefer to employ, is disclosed in U. S. Patent No. 2,104,501 Jan. 4, 1938. They are defined as "synthetic resins obtained by the condensation with formaldehyde of an equivalent methylene body or mixtures of formaldehyde and an equivalent methylene body, or mixtures of bodies falling within one or more of the following classes, namely, polyhydric phenols, derivatives of polyhydric phenols and tannins together with or in the absence of monohydric phenols." The expression "polyhydric phenolic bodies" is used as signifying polyhydric phenols as well as their derivatives and tannins. The expression "tannins" is used to denote not only the natural products but also the synthetic materials, especially those prepared from phenols and their derivatives. The expression "methylene body" is employed to indicate formaldehyde itself or any of the bodies which may be regarded as the equivalents of formaldehyde in their reactivity with phenolic bodies in the production of resin-like products. Generically, therefore, these materials may be defined as "synthetic resins obtained by the condensation of a mixture comprising a polyhydric phenolic body and a methylene body." There are several forms of this cation exchange resin. Two of these forms are generally known as the "hydrogen" form and "sodium" form. Unless otherwise specified, the hydrogen form can be used in all cases referred to in this specification. The sodium form can be used on solutions which do not contain appreciable quantities of sodium ion.

As an anion exchange material we prefer to employ a resin of the type described in U. S. Patent 2,151,883 March 28, 1939. These resins may be described generically as insoluble resin-like products obtained by the reaction of formaldehyde with an aromatic amine. As examples of aromatic amines, there may be mentioned in particular aniline and meta substituted aromatic amines, for example, m-toluidine, m-ethylaminobenzene, sym-m-xylidine and m-phenylenediamine, and the like. Generally, the meta substituted aromatic amines, including m-phenylene diamine, yield products in the nature of resins which are insoluble in dilute acids, while the corresponding ortho-substituted bodies, or certain of them, yield products which are relatively soluble in mineral acids, and the same applies to certain of the products obtained by the condensation of aniline with formaldehyde.

The anion exchange resin, specifically "IR-4" referred to in this specification is a free resin unless otherwise indicated. These anion exchange resins, specifically "IR-4" are available in other forms, for instance, as resins which have been previously treated with a solution containing a hydrogen compound of another anion which is to be introduced into the solution being treated and from which an anion is being removed.

It will be understood that the cation and anion exchange resins should be used in solutions having a respective pH within the ranges stated in this specification for the particular conditions under which they are employed. The resins may conveniently be employed by packing them into a tower through which the solution is passed, or by stirring the resin in the solution with mechanical agitation. The temperature at which the reaction is conducted may be room temperature, although, where strong acids are present, lower temperatures, as for instance, between about 5° C. and 10° C. are of advantage. It is unexpected that these resins are effective to cause ion removal or ion exchange with the particular substances mentioned herein, without substantial loss of antibiotic potency.

The advantages inherent in the above procedures will readily occur to those skilled in the art. By these procedures, it is possible to recover in good yield, from crude liquids containing them, antibiotic substances resulting from the growth of *Actinomyces griseus*.

It will be understood that, without departing from the spirit of the invention or the scope of the claims, various modifications may be made in the specific expedients described. The latter are illustrative only and not offered in a restrictive sense, it being desired that only such limitations shall be placed thereon as may be required by the state of the prior art.

We claim:

1. A process for the recovery of an antibiotically active substance from a partially purified aqueous concentrate containing metabolic products of *Actinomyces griseus* having antibiotic activity, comprising, fractionally precipitating said concentrate with acetone to remove inactive impurities as an insoluble precipitate, acting on the filtrate with excess acetone to form a precipitate containing the active substance, and recovering from the precipitate a purified substance containing antibiotic activity.

2. A process for recovering antibiotic substances from culture liquids containing metabolic products of *Actinomyces griseus*, comprising, treating said liquids with an adsorbent, treating the adsorbent with an acid-alcohol solution in order to form an eluate containing the antibiotic substance, treating the eluate with an anion exchange material thereby to remove excess acid, concentrating the treated solution, adding acetone and thereby precipitating from the treated solution a fraction containing the antibiotic activity.

3. A process, according to claim 2, wherein the eluting agent contains hydrochloric acid.

4. A process, according to claim 2, wherein the eluting agent contains sulphuric acid.

5. A process for recovering antibiotic substances from a culture liquid containing metabolic products of *Actinomyces griseus*, comprising, adsorbing said liquid on an adsorbent, treating the adsorbent with a hydrochloric acid-alcohol solution in order to elute therefrom the antibiotic substances, treating the eluate with an anion exchange material until the eluate solution reaches a pH of about 6, then separating the anion exchange material from the eluate, concentrating said eluate, precipitating active principles with acetone and isolating the precipitate containing the active material.

6. A method according to claim 11 wherein the anhydrous solvent is methanol.

7. A method according to claim 11 wherein the aqueous solutions are aqueous methanol.

8. A method according to claim 11 wherein the anhydrous solutions are methanol and the aqueous solvent is aqueous methanol.

9. A method, according to claim 11, wherein the selective solution is accomplished by first passing through the column successive portions of an aqueous solution predominantly methanol and then passing through the column an aqueous solution of methanol in which the methanol and water are in approximately equal concentrations, and then passing through the column an aqueous solution of methanol predominantly water.

10. A process for recovering antibiotic substances from culture liquids containing metabolic products of *Actinomyces griseus*, comprising, contacting said liquids with charcoal adsorbent whereby active principles are adsorbed thereon, eluting the active principles from the adsorbent with hyrochloric acid-alcohol solution, neutralizing the eluate, concentrating the active principles present in the neutralized eluate by adding successive additions of relatively small amounts of acetone and removing insoluble impurities as precipitates between said successive additions, then adding a relatively large amount of acetone in order to precipitate the active principles, separating said active precipitate, dissolving said precipitate in dilute acid, adding phosphotungstic acid to precipitate the active principles in the form of a phosphotungstate salt, separating said salt precipitate, redissolving said salt and extracting the active principles into an aqueous acid medium, neutralizing said acid medium containing the active principles, and finally separating out active principles therefrom in highly purified form.

11. A method of purifying liquids containing antibiotic activity resulting from the growth of *Actinomyces griseus*, comprising, concentrating a liquid containing active principles of *Actinomyces griseus*, adding an excess of acetone to the concentrate and thereby obtaining a precipitate of the active principles, dissolving the precipitate in an anhydrous solvent, passing the dissolved precipitate through a chromatographic adsorption column packed with an acid-washed aluminum oxide, selectively eluting the potency from the column by using successive portions of aqueous solutions of diminished concentrations of a lower aliphatic alcohol to obtain separate fractions having different potencies of antibiotic, combining those fractions having the highest potencies and recovering the desired antibiotic substance therefrom.

12. A process for obtaining active antibiotic substances from *Actinomyces griseus* which comprises, passing a liquid containing active principles of *Actinomyces griseus* over a charcoal adsorbent in which active principles are adsorbed, eluting the acting principles from said adsorbent with an acid eluting agent, neutralizing the eluate thereby obtained with an anion exchange resin, separating from the neutralized eluate any solids formed, concentrating active principles in said neutralized eluate, adding a relatively large amount of acetone and thereby precipitating desired active principles, separating said acetone-precipitated principles, dissolving said principles in an aqueous medium to form a concentrate, then adding an acid to the concentrate which precipitates said active principles in the form of a salt thereof, and finally isolating said salt.

13. A process for obtaining active antibiotic substances from *Actinomyces griseus* as recited in claim 12; wherein the acid which precipitates the active principles as a salt thereof is phosphotungstic acid.

14. A process for obtaining active antibiotic substances from *Actinomyces griseus* as recited in claim 12; wherein the acid which precipitates the active principles as a salt thereof is flavianic acid.

15. A process for obtaining active antibiotic principles from *Actinomyces griseus* which comprises, concentrating a liquid containing active principles of *Actinomyces griseus*, adding phosphotungstic acid to the concentrate, separating the precipitate formed, contacting the separated precipitate in a series of steps with an aqueous solution of a mineral acid, and with a mixture of organic solvents comprising relatively low and high boiling alcohols and diethyl ether in order to obtain the active principles in said aqueous solution free from a material amount of relatively inactive matter, neutralizing said solution and finally separating out active principles therefrom in highly purified form.

16. A process for recovering antibiotic substances from culture liquids containing metabolic products of *Actinomyces griseus*, comprising, contacting said liquids with charcoal adsorbent whereby active principles are adsorbed thereon, eluting the active principles from the adsorbent with hydrochloric acid-alcohol solution, neutralizing the eluate with an anion exchange material, concentrating the active principles present in the neutralized eluate, adding phosphotungstic acid to precipitate the active principles in the form of a phosphotungstate salt, separating said salt precipitate, contacting said precipitate with an aqueous acid medium and with a mixture of organic solvents comprising a relatively low and high boiling alcohol and diethyl ether, extracting the active principles into said aqueous acid medium, neutralizing said acid medium containing the active principles, and finally separating out active principles therefrom in highly purified form.

17. The process of claim 16; wherein the relatively low boiling alcohol is ethyl alcohol and the relatively high boiling alcohol is amyl alcohol.

18. A process for the recovery of an antibiotically active substance from a partially purified aqueous concentrate containing metabolic products of *Actinomyces griseus* having antibiotic activity, comprising, treating said concentrate with a relatively small amount of acetone to precipitate impurities, removing the latter and adding a relatively large amount of acetone thereby to form a precipitate containing the active substance, separating said precipitate, forming a concentrated solution of the precipitate, and adding phosphotungstic acid to the concentrate to precipitate the activity in the form of a phosphotungstate salt.

19. A process for recovering antibiotic substances from culture liquids containing metabolic products of *Actinomyces griseus*, comprising, contacting said liquids with charcoal adsorbent whereby active principles are adsorbed thereon, eluting the active principles from the adsorbent with hydrochloric acid-alcohol solution, neutralizing the eluate with an anion exchange material, distilling the eluate to a relatively low liquid volume, precipitating the active principles from the liquid with acetone, separating and solubilizing the separated precipitate to form a concentrate, adding phosphotungstic acid to said concentrate to precipitate the active principles in the form of a phosphotungstate salt, separating said salt precipitate, contacting said precipitate with an aqueous acid medium and with a mixture of organic solvents comprising a relatively low and high boiling alcohol and diethyl ether, extracting the active principles into said aqueous acid medium, neutralizing said acid medium containing the active principles, and finally separating out active principles therefrom in highly purified form.

EDWIN M. RICHARDSON.
G. A. GRANT.

REFERENCES CITED

The following references are of record in the file of this patent:

UNITED STATES PATENTS

| Number | Name | Date |
|---|---|---|
| 1,300,747 | Lloyd | Apr. 15, 1919 |
| 2,223,930 | Griessbach et al. | Dec. 3, 1940 |
| 2,293,954 | Tiger et al. | Aug. 25, 1942 |
| 2,443,485 | Waksman et al. | June 15, 1948 |
| 2,481,267 | Walti | Sept. 6, 1949 |

OTHER REFERENCES

Carter et al.: J. Biol. Chem., vol. 160 (Sept. 1945), pp. 337–342, 6 pages.

Waksman: "Microbial Antagonisms and Antibiotic Substances," March 1945, p. 175.

Waksman: J. Bact., vol. 46 (1943), pages 299–300 (2 pages).

Applezweig: JACS., vol. 66 (1944), page 1990 (1 page).

Fried et al.: Science, vol. 101 (1945), pages 613–615 (3 pages).

Kuehl et al.: Science, vol. 102 (1945), pages 34–35 (2 pages).